United States Patent
Han et al.

(10) Patent No.: US 9,584,617 B2
(45) Date of Patent: Feb. 28, 2017

(54) ALLOCATING CACHE REQUEST IN DISTRIBUTED CACHE SYSTEM BASED UPON CACHE OBJECT AND MARKER IDENTIFYING MISSION CRITICAL DATA

(71) Applicants: Xiao Han, Shanghai (CN); Kun Liu, Shanghai (CN); Peter Zhao, Shanghai (CN); Edward Lu, American Canyon, CA (US); Jessica Yang, Sunnyvale, CA (US); Tim Ke, Shanghai (CN)

(72) Inventors: Xiao Han, Shanghai (CN); Kun Liu, Shanghai (CN); Peter Zhao, Shanghai (CN); Edward Lu, American Canyon, CA (US); Jessica Yang, Sunnyvale, CA (US); Tim Ke, Shanghai (CN)

(73) Assignee: SUCCESSFACTORS, INC., So. South Francisco, CA (US)

( * ) Notice: Subject to any disclaimer, the term of this patent is extended or adjusted under 35 U.S.C. 154(b) by 327 days.

(21) Appl. No.: 14/144,948

(22) Filed: Dec. 31, 2013

(65) Prior Publication Data

US 2015/0189033 A1 Jul. 2, 2015

(51) Int. Cl.
G06F 15/16 (2006.01)
H04L 29/08 (2006.01)

(52) U.S. Cl.
CPC ......... *H04L 67/2842* (2013.01); *H04L 67/288* (2013.01)

(58) Field of Classification Search
USPC ................. 709/203, 223, 224, 226
See application file for complete search history.

(56) References Cited

U.S. PATENT DOCUMENTS

| | | | |
|---|---|---|---|
| 5,706,463 A * | 1/1998 | Ebrahim | G06F 12/0822 711/120 |
| 5,864,852 A | 1/1999 | Luotonen | |
| 5,875,465 A * | 2/1999 | Kilpatrick | G06F 12/0848 711/123 |
| 5,896,506 A | 4/1999 | Ali et al. | |
| 6,363,411 B1 * | 3/2002 | Dugan | H04M 3/42136 379/201.01 |
| 6,438,652 B1 | 8/2002 | Jordan et al. | |
| 6,687,846 B1 | 2/2004 | Adrangi et al. | |
| 6,760,765 B1 | 7/2004 | Asai et al. | |
| 7,146,430 B2 | 12/2006 | Kobayashi | |
| 7,640,296 B2 | 12/2009 | Fuchs et al. | |
| 7,689,660 B2 | 3/2010 | Kilian et al. | |

(Continued)

*Primary Examiner* — Liangche A Wang
(74) *Attorney, Agent, or Firm* — Fountainhead Law Group P.C.

(57) ABSTRACT

Various embodiments of the present disclosure provide improved systems and techniques for intelligently allocating cache requests to caches based upon the nature of the cache objects associated with the cache requests, and/or the condition of the caches in the distributed cache system, to facilitate cache system utilization and performance. In some embodiments, an allocation of cache requests may be performed in response to detection of a problem at one of a group of cache servers. For example, in some embodiments, a particular cache server may be entered into a safe mode of operations when the cache's ability to service cache requests is impaired. In other embodiments, an allocation of cache requests may be performed based on an cache object data type associated with the cache requests.

20 Claims, 7 Drawing Sheets

(56) References Cited

U.S. PATENT DOCUMENTS

| | | |
|---|---|---|
| 7,694,065 B2 | 4/2010 | Petev et al. |
| 7,933,947 B2 | 4/2011 | Fleischer et al. |
| 8,195,767 B2 | 6/2012 | Albrecht et al. |
| 8,484,314 B2 | 7/2013 | Luna et al. |
| 8,707,323 B2 | 4/2014 | Galchev et al. |
| 8,769,156 B2 | 7/2014 | Annamalaisami et al. |
| 8,788,458 B2 | 7/2014 | Waterman et al. |
| 2004/0153694 A1* | 8/2004 | Nicholson ............. G06F 9/4416 714/6.31 |
| 2005/0060126 A1* | 3/2005 | Coulson ................. G06F 1/206 702/186 |
| 2009/0204763 A1* | 8/2009 | Shum .................... G06F 9/3824 711/119 |
| 2014/0089256 A1* | 3/2014 | Mardugalliamov G06F 17/30168 707/609 |
| 2015/0309883 A1* | 10/2015 | North ................. G06F 11/1438 714/19 |

* cited by examiner

ALLOCATING CACHE REQUEST IN DISTRIBUTED CACHE SYSTEM BASED UPON CACHE OBJECT AND MARKER IDENTIFYING MISSION CRITICAL DATA

BACKGROUND OF THE INVENTION

The invention disclosed herein relates generally to computing and data storage. More specifically, the invention relates to the operation of a distributed cache system.

In computer systems, a cache is a data structure that stores data so that future requests for that data can be processed faster. For example, the data that is stored within a cache might consist of data that has been computed earlier or it may consist of duplicates of data that is originally stored elsewhere (e.g., a database), in an application system. Frequently, repeated accesses to the same data in the application system may be required. By providing access to such data in a cache, the time required to respond to a request for such data can be shortened. Use of caches can substantially reduce system performance time in some application systems. Usually, if requested data is contained in a cache (cache hit), a computer system may service the request simply by reading the cache. If the requested data results in a cache miss, the computer system may then recompute or fetch the data from an original storage location, which takes more time.

In the past, an application system usually only employed one cache. In modern systems requiring a large number of data accesses, frequently, a distributed cache system is deployed that utilizes multiple caches distributed over more than one location. For example, a distributed cache system may include a local cache located within or in proximity to an application server, as well as a remote cluster of cache servers, which are accessible to the application. The use of multiple caches allows for larger cache sizes. As a side benefit, providing multiple caches allows for the possibility of selective use of caches. It would be advantageous to improve the performance of distributed cache systems to provide faster response times for data accesses in an application system by intelligently allocating cache requests to caches in a distributed cache system.

BRIEF SUMMARY OF THE INVENTION

Various embodiments of the present disclosure provide systems and techniques for intelligently allocating cache requests among multiple caches in a distributed cache system. In some situations, an allocation of cache requests may be performed in response to detection of a problem at a cache or a cache cluster. In other embodiments, assignment of cache requests to different caches or different cache clusters may be determined based on a cache object data type associated with the cache requests as further described herein.

Some embodiments of the present disclosure provide techniques and mechanisms for responding to problems at a cache of a distributed cache system. A cache server in a distributed system may experience difficulties responding to cache requests for a number of different reasons: examples of such problems may include cache server breakdowns, a cache server becoming overloaded with cache requests, or network congestion issues which make it more difficult to communicate with a cache server for some period of time, for example. Various embodiments provide techniques for monitoring cache servers, and when a slowdown in service is detected at a cache server, switching to a safe mode of cache operation with respect to that cache server until resumption of normal performance is detected or determined. In some embodiments, safe mode may involve ceasing to send cache requests to that cache server until it has been determined that the cache server in question has resumed normal operations.

To accomplish these results, in some embodiments, a time period a cache server takes to respond to a cache request may be monitored. When the time period exceeds a predetermined time threshold, a time out exception may be thrown. After a time out exception is thrown, monitoring of cache requests to the cache server may continue, and when any additional responses to cache requests are not returned within the predetermined threshold, time out exceptions may be thrown for those cache requests as well.

When a number of time out exceptions thrown with respect to a particular cache server occurs more than a predetermined number of times over a predetermined time frame, safe mode for the cache server may be triggered. Safe mode may take a number of different forms. According to one embodiment, a cache server experiencing difficulties may be taken offline, and no cache requests may be directed to that cache server until it has been determined that the cache server at issue has recovered, as further described below.

Mechanisms for determining whether a cache server has resumed normal operations may be referred to herein as "auto recovery". According to some embodiments, at predetermined time intervals, a test may be performed to determine whether a cache server placed in safe mode has recovered its ability to respond to cache requests in a timely manner. If a determination is made that the cache server has recovered and can again respond to requests in a timely manner, a re-entry into normal mode of operations for the cache server may be performed.

In some embodiments, an auto recovery process may include allowing a first predetermined time period after entry into safe mode. During such time period, no cache requests may be allowed to go through to the remote cache server.

After the first predetermined time period has passed, a predetermined number of cache requests (referred to hereafter as "test" cache requests) may be allowed to go through to the remote cache server. In some embodiments, after the test cache requests are sent, a second predetermined time period may be allowed during which responses to the test cache requests are monitored.

After the second predetermined time period has passed, it may be determined whether any time out exception have been thrown in connection with any of the predetermined number of test cache requests. In circumstances where one or more time out exceptions are thrown, the cache server may be deemed to have failed the auto-recovery test, and the auto-recovery process may start over again. That is, the set predetermined first time period may be allowed to pass again, after which a predetermined number of test cache requests may again be sent to the cache server in question.

By contrast, when, after the second predetermined time period, it is found that no time out exceptions were thrown in response to the test cache requests, re-entry for the cache server into normal cache mode may be performed. In some embodiments, this may mean that the cache server may again be sent its usual allotment of cache requests, for example.

In some embodiments, a distributed cache system may, in the alternative or additionally, implement a system for monitoring the health of cache servers and taking steps to protect a distributed cache system, when a particular cache server is unhealthy or dies. According to one embodiment, a server monitor may monitor the health of a plurality of servers by periodically sending a heartbeat signal to the plurality of servers. If a cache server of the plurality of servers does not provide a responsive signal within a predetermined heartbeat threshold time period, the server monitor may send a notification that the cache server has failed to respond to a heartbeat message, to a cache coordinator. In response to the notification, the cache coordinator may take the cache server offline (e.g., by triggering a process where the application server ceases to send cache requests to that cache server).

In some embodiments, after taking a cache server offline, the cache coordinator may be notified at a later time that it has been determined that the cache server is healthy again. In some embodiments, after confirming that resumption of normal operations at the cache server, the system may again allow the cache server to resume operations as a cache server.

Additionally, as noted above, in various embodiments, techniques and mechanisms may be provided for differentiating between different types of cache objects, and intelligently assigning cache requests to cache servers in a distributed cache system based on cache object data types associated with the cache objects.

A data type may be determined by any of a variety of different characteristics. For example, in some embodiments, a data type may correspond to a company associated with the originating source of the data in question. For example, in some embodiments, where a cache object originates from a company from whom a high volume of cache requests is expected, all such cache requests may automatically be directed to remote cache servers of a distributed cache system in order to avoid overloading local caches in the system. In the alternative, in some embodiments, whether a cache object originates from a company whose requests are to be given higher priority (for example, because of a quality of service arrangement with the company), the cache object may be stored on a local cache.

In other embodiments, a data type may be determined based upon whether a cache object is a seldom changed and/or frequently used cache object. In some embodiments, where a cache object qualifies as a seldom changed and/or frequently used cache object, such cache object may be stored on a local cache in order to improve the speed with which data accesses of such cache object may be performed, as it is typically faster to access local caches than remote caches.

In other embodiments, a data type may be determined based upon whether a cache object is associated with mission critical data. Cache objects associated with mission critical data may be stored in local caches in order to assure faster access to such data.

In some embodiments, as noted above, a local cache may be located on a same application server that runs an application that utilizes the distributed cache system. Remote caches may be located in physically distinct servers that are separate from the application server.

Further, in some embodiments, an analysis may be performed of the number of cache requests of different cache object data types generated by user requests to an application system. And cache requests relating may be assigned to particular caches (e.g., a local or a remote cache) based on the results of the analysis of the number of cache requests generated for different cache object data types.

In another embodiment, the invention pertains to a computer system that includes a processor and a memory that are configured to perform one or more of the above described operations. In another embodiment, the invention pertains to a system having a processor and memory that are configured to perform one or more of the above described operations. In another embodiment, the invention pertains to at least one computer readable storage medium having computer program instructions stored thereon that are arranged to perform one or more of the above described operations.

The following detailed description and accompanying drawings provide a better understanding of the nature and advantages of the present invention.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION

Described herein are techniques and systems for intelligently allocating cache requests among caches in a distributed cache system. In the following description, for purposes of explanation, numerous examples and specific details are set forth in order to provide a thorough understanding of various embodiments of the present disclosure. It will be evident, however, to one skilled in the art that various embodiments as defined by the claims may include some or all of the features in these examples alone or in combination with other features described below, and may further include modifications and equivalents of the features and concepts described herein.

Embodiments of a method and system for intelligently distributing cache objects and/or cache requests in a distributed cache system, in accordance with various embodiments of the present disclosure, are described herein with reference to the drawings in FIGS. 1 through 7.

As noted above, in some embodiments, a distributed cache system, for example, including both local and remote caches, may be improved by intelligently distributing cache requests. In some embodiments, cache requests and/or cache objects may be allocated to caches based upon characteristics of the cache objects, and/or conditions at different caches. In some embodiments, a local cache may be located on an application server that runs an application that utilizes the distributed cache system. Remote caches may be located in physically distinct cache servers that are separate from the application server.

As noted above, intelligent allocation of cache requests may be desirable where a cache server of a distributed cache system is experiencing reduced performance which could negatively impact the operation of the data system if left unaddressed. As noted above, causes for such cache disruptions may include load on the cache in question, physical issues with the cache, or network congestion on the network links to the cache, among other things.

Interruptions in cached service can impact an application system's ability to respond to data requests thus potentially significantly impairing an application system's performance. Accordingly, in some embodiments, when a cache is experiencing difficulties, the number of cache requests directed to the impaired cache may be reduced for a period of time in order to safeguard the cache system and prevent deterioration of application system performance. Altering the impaired cache's operations in this manner is referred to herein as placing the cache in question in cache safe mode.

In order to accomplish this result, in various embodiments, mechanisms are provided for monitoring caches to identify any problems/delays arising in connection with the caches' operations. In one embodiment, when excessive time outs occur in connection with the operations of a given cache, cache safe mode may be triggered for that cache. According to some embodiments, in safe cache mode, the data system may redirect traffic that would usually be sent to the cache, to a different cache or caches instead as further described herein. After a predetermined time period, the data system may again attempt to access the cache that is experiencing difficulties. If it appears that the problems/delays associated with that remote cache server are no longer present, the data system may return that cache server to "normal cache mode" of operations. In normal cache mode, the data system may again send cache requests to the cache server in question as usual.

Additionally, as noted above, in various embodiments, techniques and mechanisms may be provided for differentiating between different types of cache objects, and intelligently assigning cache requests to cache servers of a distributed cache system based on cache object data types associated with the cache requests.

A cache object data type may correspond to a variety of different factors. For example, in some embodiments, a data type may be determined by a company associated with the originating source of the data in question. In some embodiments, where data associated with a cache object originates from a company from whom a high volume of cache requests is expected, for example, all such cache requests may automatically be directed to remote cache servers of a distributed cache system in order to avoid overloading local caches in the system. In the alternative, in some embodiments, where data associated with a cache object originates from a company whose requests are to be given higher priority (for example, because of a particular quality of service arrangement), the cache object may be stored on a cache which provides faster access to data (e.g., a local cache).

The ability to change the caching strategy applied to a cache object according to the cache object's data type—for example, a company from whom the data originates, or the nature of the data associated with the cache object—provides the opportunity to improve the performance of a distributed cache system. That is, having the flexibility to intelligently assign cache objects to particular caches based on different characteristics of the cache objects may allow a cache system to provide faster responses to client data requests and thus improve application performance.

Further, in some embodiments, mechanisms may be used for altering the caching strategy adopted for a data type over time based upon information gathered during a cache system's operations concerning the number of cache objects of different types generated by user requests to an application system, for example, and/or the frequency of user requests to access cache objects of different types in a cache system over time, for example. This may be accomplished by monitoring cache requests, and adjusting allocations of different cache object data types to different cache servers based upon analysis of such information.

Advantages of the present disclosure include providing automated features for assigning cache objects and/or cache requests to different caches in a distributed cache system according to conditions at different caches, or based upon characteristics of different cache objects. Such selective assignment may allow, among other things, more effective prioritization of important data accesses, and/or protection against delays in data accesses due to breakdowns at particular caches.

The ability to change caching strategy based on cache object data types—whether based on the company from whom a cache object originates, or the nature of the data associated with the cache object—or based on information regarding breakdowns at particular caches, for example, provides the opportunity to improve the performance of a distributed cache system. That is, having the flexibility to intelligently select particular caches (for example, remote and/or local caches) for use with particular cache object types or cache requests may allow a cache system to optimize caching strategy.

Figure 1:
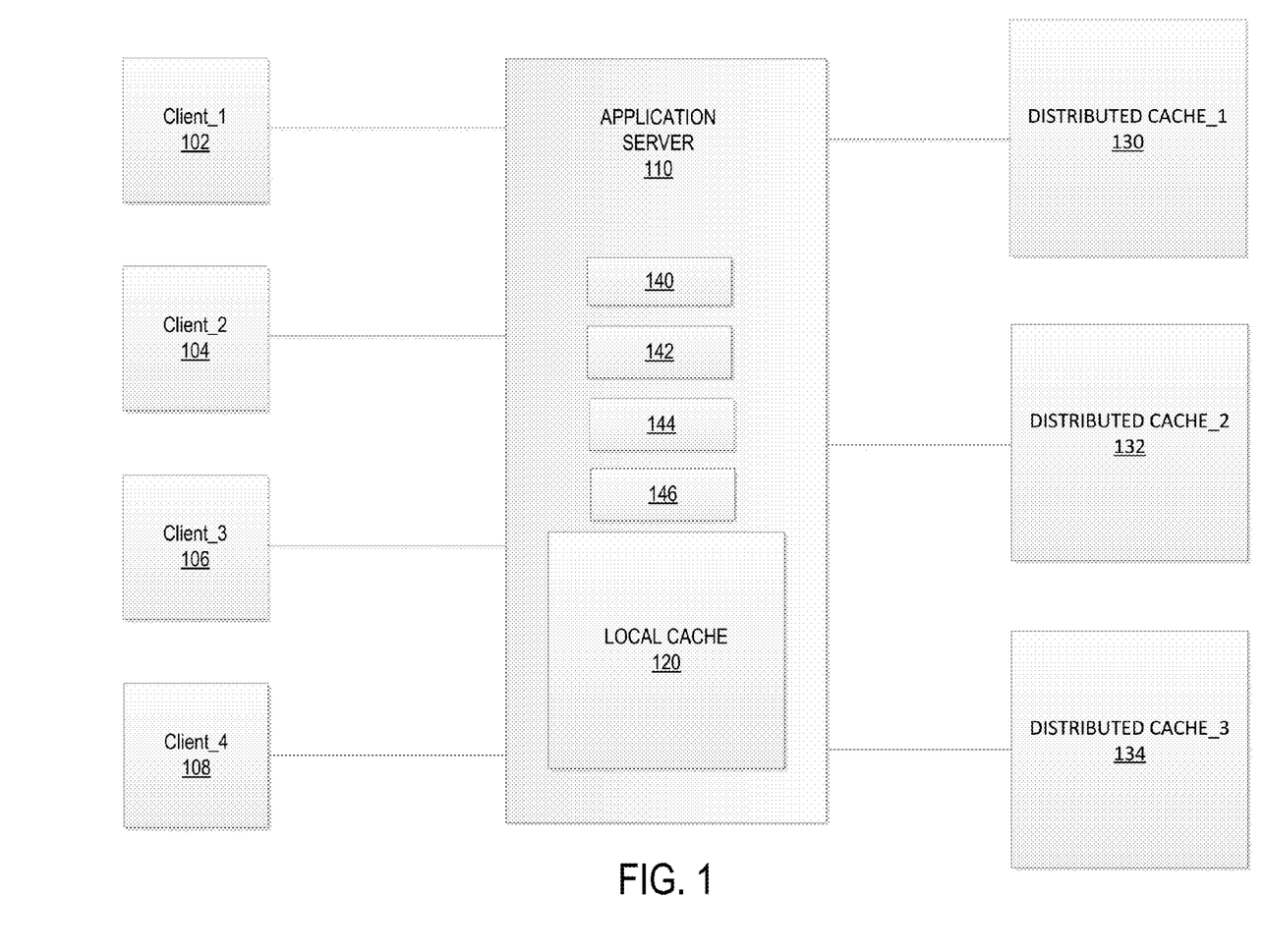
FIG. 1 depicts a block diagram of a network topology including a distributed cache system according to one embodiment.

Embodiments for improved techniques and systems for using a distributed cache system may be implemented in a wide variety of networking contexts. Turning to FIG. 1, a network topology comprising hardware and software components configured according to one embodiment of the present invention is illustrated. The network topology presented comprises client devices 102, 104, 106, and 108, connected to an application server 110. Application server 110 may comprise one or more servers, and may include any suitable modules for performing intelligent caching operations as discussed further herein. Application server 110 shown in FIG. 1 includes a local cache 120. Application server 110 is also connected to three distributed cache servers 130, 132 and 134. These distributed cache servers may be said to comprise a cache cluster.

Application server 110 may include a cache coordinator 140, a routing table 142, a time out monitor 144, and a safe mode monitor 146. Cache coordinator 140 may coordinate access to the distributed cache system, which includes the cache cluster (cache servers 130, 132, and 134) as well as to local cache 120, by scheduling transmission of different cache requests to the caches. That is, cache manager 140 may be responsible for assigning or allocating cache requests to different caches. This may be accomplished by using routing table 146, among other things.

Routing table 142 may be a table stored in application server 110 that lists the routes to particular network destinations, including cache servers 130, 132 and 134, as well as local cache 120. Routing table 142 may contain information about the topology of the distributed cache system. The construction of routing table 142 may be performed in a variety of different ways. Entries in a routing table may refer to specific caches in the distributed cache system, and they may be entered via an automatic network topology "discovery" process. In alternative embodiments, entries in routing table 142 may be entered via entries made by a system administrator, for example, and the entries/routes may be fixed until altered by the system administrator.

According to various embodiment, cache requests may be assigned to different caches by employing a scheduling mechanism. For example, scheduling may be based on a round robin system (such as standard round robin, deficit round robin, or weighted round robin). In alternative embodiments, cache requests may be assigned to different caches based on a predetermined mapping of particular client devices (for example, 202, 204, 206, and 208) to particular caches (120, 130, 132, 134).

A cache request may consist of a request to store, modify or read a particular piece of data, for example. If the request is to store data, for example, cache coordinator 140 may process the cache request to determine in which cache of the distributed cache system the cache object associated with the piece of data at issue should be stored. In the usual case, a scheduling mechanism, as described above, may be used to determine the assignment of cache request to a particular cache. However, where intelligent allocation of the cache request is appropriate, the assignment of the cache request to a particular cache may take account of other considerations (e.g., such as condition of the caches, and/or a cache object data type associated with the cache request), as further described below.

It will be understood that, in some embodiments, application server 110 and distributed cache servers 130, 132 and 134 may be part of a same network that is different from a network that includes client devices 102, 104, 106, and 108.

Application server 110 may be accessed by client devices 102, 104, 106, and 108, through a wireless or wired connection to the Internet, for example. Embodiments of the above network topology may be implemented in a wide variety of network environments including, for example, Ethernet networks, TCP/IP-based networks, telecommunications networks, and wireless networks, etc., or a combination of such networks Implementations are contemplated in which users can interact with application server 110 using a diverse range of computing devices, for example, client devices 102, 104, 106, and 108, may be mobile devices (e.g., personal digital assistant (PDA) or smartphones), laptops, desktop computers, tablets, or any other computing devices that may provide access to the services provided by application server 110.

According to one embodiment, application server 110 may comprise a single server. In alternative embodiments, application server 110 may correspond to multiple distributed servers and data stores, which, for example, may be part of a cloud network, and which together perform the functions described herein. Such a system of distributed servers and data stores may execute software programs that are provided as software services (e.g., Software-as-a-Service (SAAS)). Embodiments of a distributed cache system may be implemented in a wide variety of network environments as further described herein.

Figure 2:
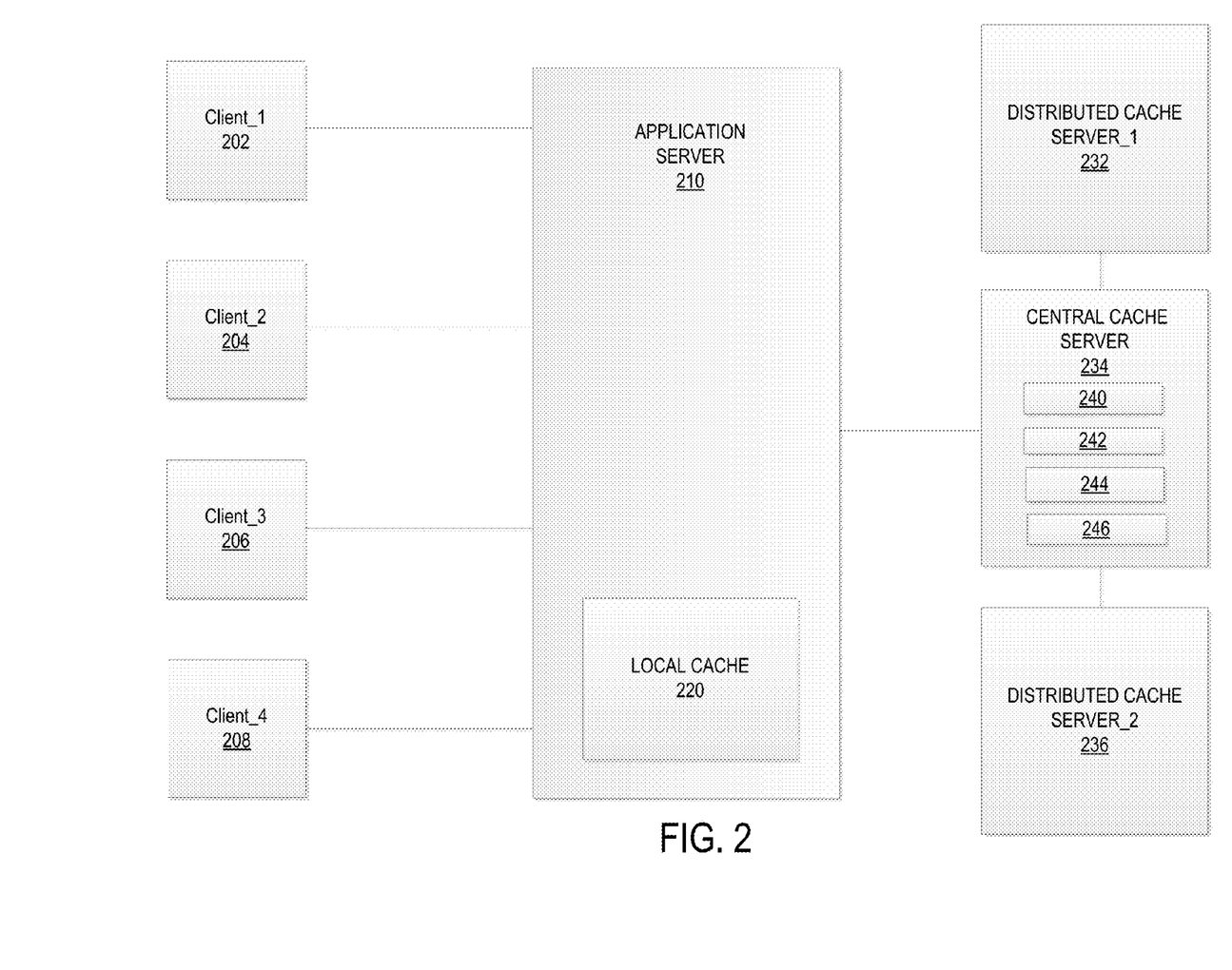
FIG. 2 depicts a block diagram showing a second network topology including a distributed cache system according to one embodiment.

FIG. 2 presents a network topology comprising hardware and software components configured according to a second embodiment of the present invention. The network topology presented comprises client devices 202, 204, 206, and 208, connected to an application server 210. As illustrated in FIG. 2, application server 210 may include a local cache 220. Further, application server 210 may be connected to a central cache server 234, which is in turn connected to a distributed cache server_1 232 and a distributed cache server_2 236. These three cache servers 232, 234 and 236 may be said to comprise a cache cluster. Each of these cache servers may comprises one or more servers.

Further, as illustrated in FIG. 2, central cache server 234 may include a cache coordinator 240, a routing table 242, a time out monitor 244, and a safe mode monitor 246. All of these components may operate together to provide distributed cache services. And, in this embodiment, these elements may perform functions similar to those performed by cache coordinator 140, routing table 142, time out monitor 144, and safe mode monitor 146, described above in connection with FIG. 1.

According to one embodiment, central cache server 234 may utilize the cache cluster represented by cache servers 232, 234 and 236, as well as the cache 220 local to application server 210, in providing caching services.

Figure 3:
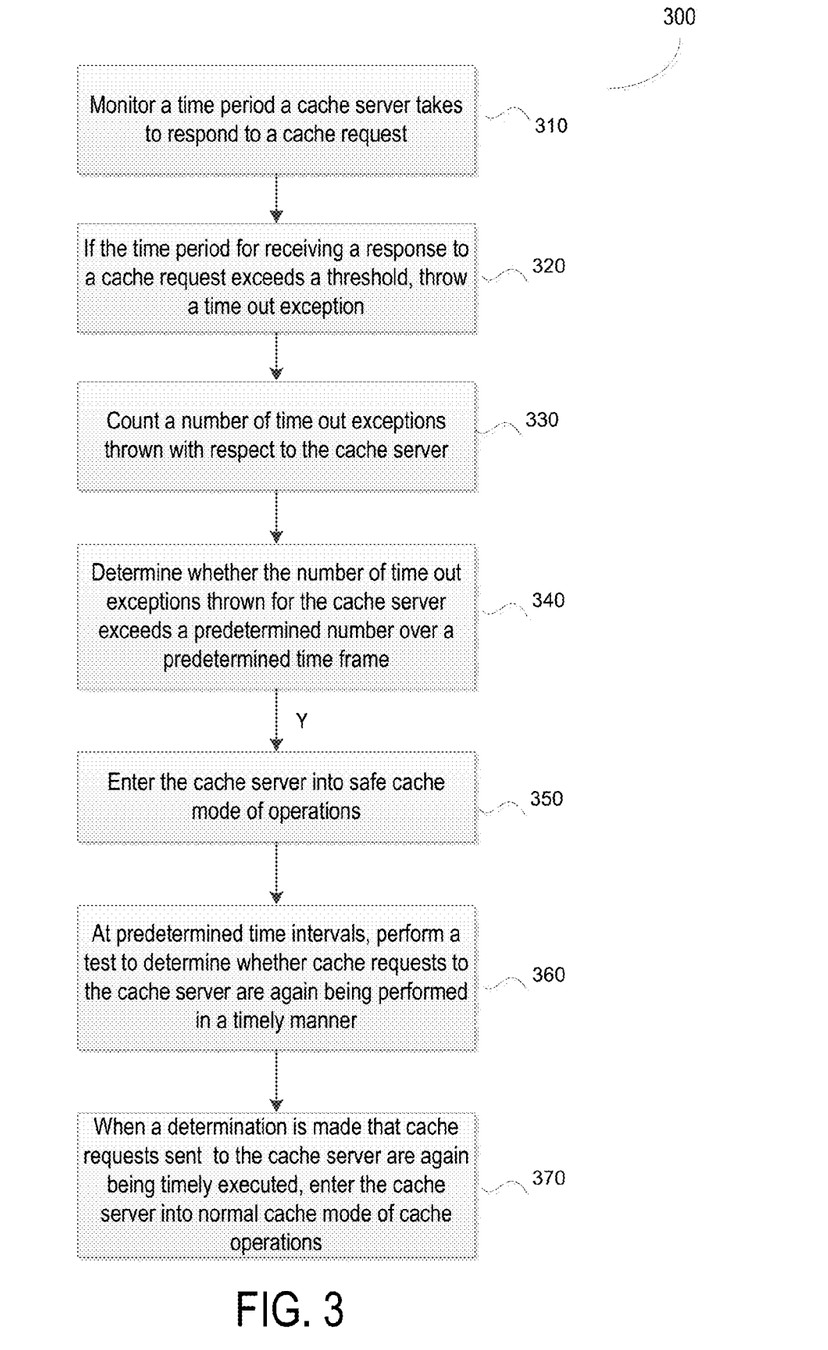
FIG. 3 depicts a flow for a cache safe mode according to one embodiment.

FIG. 3 is a flow diagram illustrating a method performed in implementing a cache safe mode according to one embodiment. The specific example of distributed cache system depicted in FIG. 1 will be referenced for purposes of explanation, but it will be understood that, in practice, a system implementing a cache safe mode may be performed in a cache system that need not have all of the features, or the same network context, as the distributed cache system depicted in FIG. 1.

In one example, application server 110 receives a request from one of clients 102, 104, 106, and 108 to retrieve data. Application server 110 then sends a request to cache coordinator 140 to check if the data has been cached already. Cache coordinator 149 determines which of the distributed caches 120, 130, 132, and 134 may have been assigned that data. It then sends a request to that cache server to retrieve the data.

In the alternative, if the request is to store data, for example, cache coordinator 140 may process the cache request to determine in which cache of the distributed cache system the cache object associated with the piece of data at issue should be stored.

FIG. 3 illustrates some of the steps that might follow.

In 310, once the request to store the cache object has been sent, according to various embodiments, time out monitor 144 measures how long it takes the assigned cache to perform the requested task. In the context of a request to store data, the response may consist of a confirmation that the cache object in question has been successfully stored. (Alternatively, for example, in the context of a request to read data, the response may consist of the cache returning a cache object containing the requested data.) Whatever the desired cache action, in various embodiments, an amount of time between a time a cache request is sent, and a time a cache response is received may be measured, by time out monitor 144.

In 320, when the amount of time it takes a cache server to respond to a cache request exceeds a predetermined threshold, time out monitor 144 may throw a time out exception. That is, when the time period required to receive a response from a cache exceeds a predetermined time allotted for a process or operation, a time out exception may be issued by time out monitor 144. Time out monitor 144 may also send a message to safe mode monitor 146 regarding any time out exceptions thrown. As one example, an application system may expect a particular cache action to take 50 milliseconds. Once 100 milliseconds passes without receiving a response back from the cache server, a time out exception may be thrown by time out monitor 144.

Rather that triggering safe mode immediately in response to one time out exception being thrown, further requests may be monitored to see whether the cache server is able to respond to those requests in a timely manner. Further, at the same time a first time out exception is thrown, a timer may be set to monitor how many additional time out exceptions are thrown within a given time frame following the first timeout exception.

In 330, safe mode monitor 146 may count a number of time out exceptions thrown with respect to each cache over such given time frames. It may perform this task using a counter, in some embodiments. That is, the time out exceptions thrown by time out monitor 144 for each of cache servers 130, 132 and 134 may be counted, on a per cache server basis by safe mode monitor 146, over different time periods. Note that application server 110's safe mode monitor 146 may monitor in parallel the time out exceptions thrown with respect multiple caches in the distributed cache system.

It is noted that in alternative embodiments, the number of time out exceptions thrown may be counted with respect to each cache cluster of the distributed cache system rather than with respect to each cache. In such systems, entry into safe mode may involve placing an entire cache cluster into safe mode, rather than individual caches.

In 340, safe mode monitor 146 determines whether the number of time out exceptions thrown with respect to a particular cache exceeds a predetermined number over a predetermined time frame. It will be understood that, in some embodiments, the predetermined time frame is not fixed in time, but rather fixed in duration. That is, the time window is a moving time window in the sense that its start time may correspond to any point in time that a time out exception is thrown for the cache is question. In some embodiments, safe mode monitor 146 may notify cache coordinator 140 whenever the number of time out exceptions thrown with respect to a particular cache exceeds a predetermined number over a predetermined time frame.

In one example, where the number of time out exceptions thrown in any 60 second time frame exceeds fifty time out exceptions, safe mode monitor 146 may determine that the cache server has failed the timeout exception test, and notify cache coordinator 140 of this occurrence.

Measuring time out exceptions that occur in a predetermined time window to trigger safe mode insures that isolated failures to respond to cache requests in a timely manner do not automatically trigger entry of a cache server into safe mode; rather, only failures of a more sustain nature trigger safe mode. Such a mechanism may reflect a judgment that the failure of one request to be processed in an expected time frame may not constitute a circumstance requiring entry into safe mode.

In 350, once it receives a notification that a cache has failed the time out exception test, cache coordinator 140 may enter the cache in question into cache safe mode of operations, as further described herein. Note that various embodiments allow for selective placement of caches experiencing difficulties into cache safe mode, while allowing the rest of the cache system to continue performing as usual.

It is contemplated that putting a cache in cache safe mode may be performed in a variety of different ways. What such safe mode solutions may have in common is that requests to the impaired cache server may be reduced or eliminated during the duration of cache safe mode. In one example, all cache requests to store data that would ordinarily be directed to the cache server may be diverted instead to local cache 120. In some embodiments, such redirection of traffic may be effected through making revisions to routing table 142. In some embodiments, where the cache requests cannot be handled by local cache 120 or where local cache 120 does not exist, such cache requests may be allowed to proceed to an original storage location for the data (e.g., a database).

In some embodiments, when a cache server 130, 132 or 134 enters cache safe mode, all cache requests to read data in the impaired cache may be suspended, and the application system may instead automatically direct all such data requests to the original storage location for the data (e.g., a database) instead. Such a result may be achieved through revisions to routing table 142 in some embodiments.

In one example, the responsive action may involve removing the cache server's IP address from a list of active cache servers in routing table 142. In this way it may be ensured that all cache requests are traversed only to healthy cache servers. That is, in some embodiments, the revisions to routing table 242 may enable cache requests to be redirected from the unhealthy cache server to healthy cache servers. Entering an impaired cache server into safe mode prevents the impaired cache from affecting the performance of the entire application system.

Once a cache server is in safe mode, the data system may continue to monitor its performance to see when and if it recovers from the problems it was experiencing. In 360, for example, at predetermined time intervals, a test may be performed to determine whether cache requests to the cache server are again being performed in a timely manner.

In 370, when a determination is made that requests to the cache server are again being timely executed, a re-entry into normal mode of operations may be automatically triggered. In normal mode of operations, cache coordinator 140 may again begin to include the cache server at issue in the group of cache servers to which cache requests are being sent. Then the procedure 300 described in FIG. 3 for monitoring the cache server to determine whether it is experiencing difficulties may begin again with respect to the cache server.

As noted above, in some embodiments, when a determination has been made that the cache server experiencing difficulties has recovered and can resume normal system operations, the cache server at issue may be brought back on line, and resume operations in what may be referred to as "normal cache mode". One embodiment of an auto recovery process from cache safe mode embodiment is depicted in the flow illustrated in FIG. 4. Auto recovery is an automatic process for determining when it is appropriate to bring a cache server presently in safe mode back to normal operations.

As noted above, in alternative embodiments, cache safe mode may be performed on a cluster basis instead of cache basis, such that time out exceptions are monitored with respect to the number of time out exceptions thrown with respect to a cluster, and not individual caches. In a cluster based system, a whole cache cluster which is experiencing difficulties will be brought into safe mode, and when that cluster recovers, that whole cache cluster will be brought back into normal mode. It is noted that, in such embodiments, shutting down an individual cache server will not trigger safe mode for the whole cluster unless the remaining servers of the cluster are unable to process cache requests directed to the cluster in a timely manner.

Figure 4:
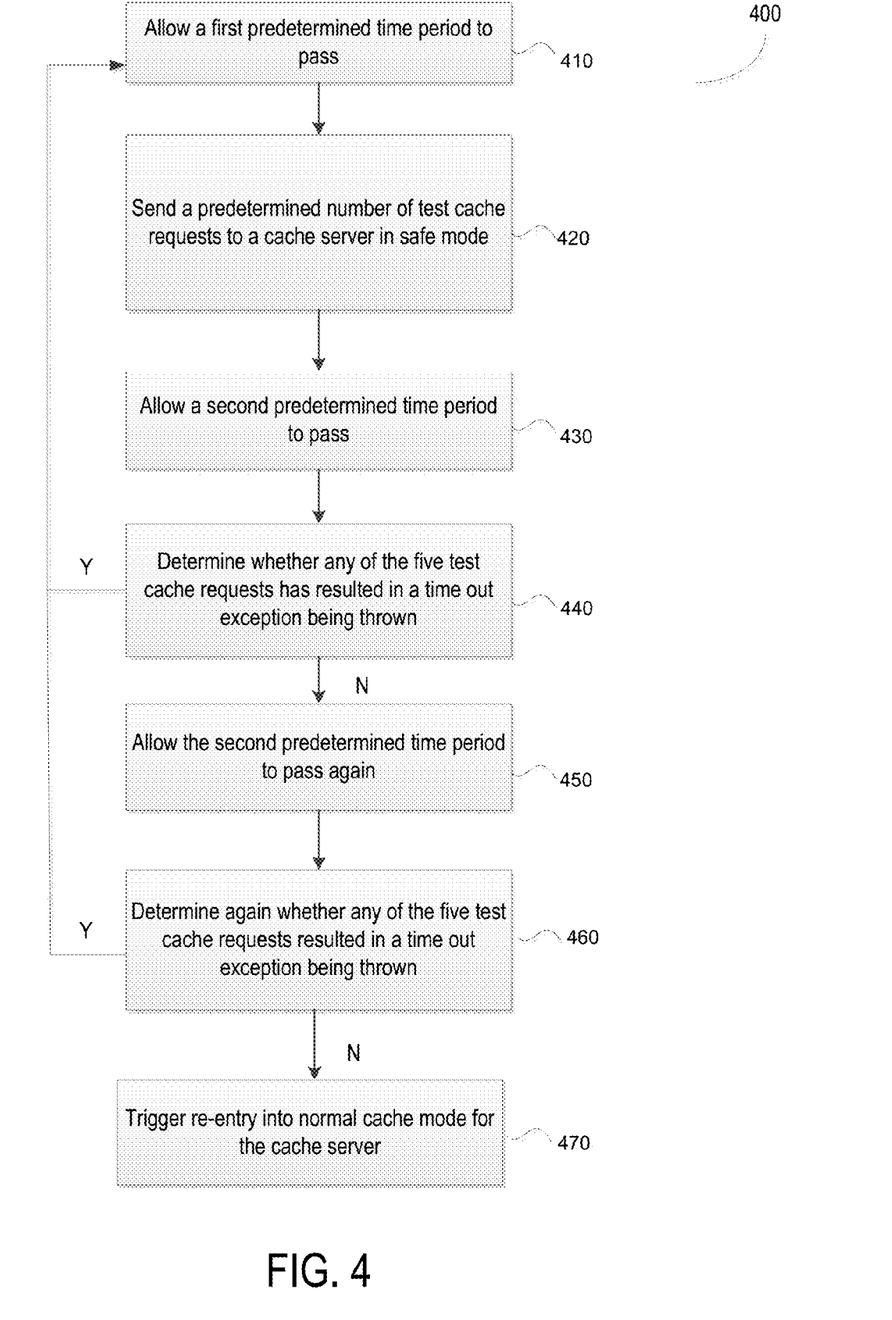
FIG. 4 depicts a flow for auto recovery from a cache safe mode according to one embodiment.

FIG. 4 is a flow diagram illustrating a method performed in implementing an auto recovery process from cache safe mode according to one embodiment. The specific example of the distributed cache system depicted in FIG. 1 will be referenced for purposes of explanation, but it will be understood that, in practice, a system implementing a cache safe mode may be performed in a cache system that need not have all of the features, or the same network context, as distributed cache system depicted in FIG. 1.

In one example, assuming that cache coordinator 140 has entered a particular cache server into safe mode, it may periodically check to determine whether the cache server has recovered from whatever state caused it to previously fail to respond to cache requests in a timely manner. It will be understood that many variations on the below process might exist that would come within the scope of various embodiments of the present disclosure.

Note that although the steps performed in FIG. 4 are described as being performed by cache coordinator 140, it will be understood that they may also be performed by application server 210 or another entity, in other embodiments.

In 410, a first predetermined time period may be allowed to pass in which a cache server is operated in safe mode (as described above). This time period may be configurable by a system administrator in some embodiments. As one example, the time period may be five minutes.

In 420, after the predetermined time period has passed, a predetermined number of cache requests may be sent to the cache server. That is, access to the cache server may again be permitted, and five cache requests may be let through to the cache server, after which access to the cache server is again latched. In one example, five cache requests may be allowed to pass through to the cache server.

In 430, a second predetermined time period may be allowed to pass during which time out monitor 440 checks to see whether any of the five cache requests have resulted in time out exceptions being thrown. As one example, the predetermined time period may also be five minutes.

In 440, after waiting the second predetermine time period (e.g., five minutes), time out monitor 440 may determine whether any time out exceptions have been thrown for the cache server in connection with the five cache requests sent in the earlier step. Central cache server 434 may determine this by checking time out exception counter 442, for example.

If it is determined that a time out exception has been thrown for any of the five cache requests, procedure 400 may return to step 410, it may be determined that the cache server is still experiencing difficulties, and restart the auto recovery process.

In 450, if it is determined that a time out exception has not been thrown as of yet for any of the five cache requests sent through to the cache server as a test, then procedure 400 may continue to monitor and count the time out exceptions thrown for the cache server for a third predetermined time period, for example, five minutes.

In 460, after allowing another five minute to elapse, it may again be determined whether any of the five cache requests have resulted in a time out exception being thrown. If no time out exceptions have been thrown, central cache server 234 may determine that the cache server at issue has resumed normal operations, and it is safe to allow that cache server to enter into normal mode of operations once again.

Then in 470, central cache server 234 may trigger re-entry into normal cache mode for the cache server. In sum, if the cache server successfully gets through the third monitored time period without any time out exceptions being thrown, then cache server 234 may determine that the cache server has recovered and start to use it again. Safe mode may be turned off, and the cache server may be operated as before.

On the other hand, if a time out exception was thrown during the third monitored time period, the procedure 400 may return to the start of the process, and begins the auto-recovery process from the start again at step 410.

It is noted that in alternative embodiments certain steps described above may not be included. For example, in some embodiments, the system may not include steps 450 and 460. In such an embodiment, if, in step 450, it is determined that a time out exception has not been thrown as of yet for any of the five cache requests sent through to the cache server as a test, the process may proceed immediately to step 470 where central cache server 234 may trigger re-entry into normal cache mode for the cache server.

Figure 5:
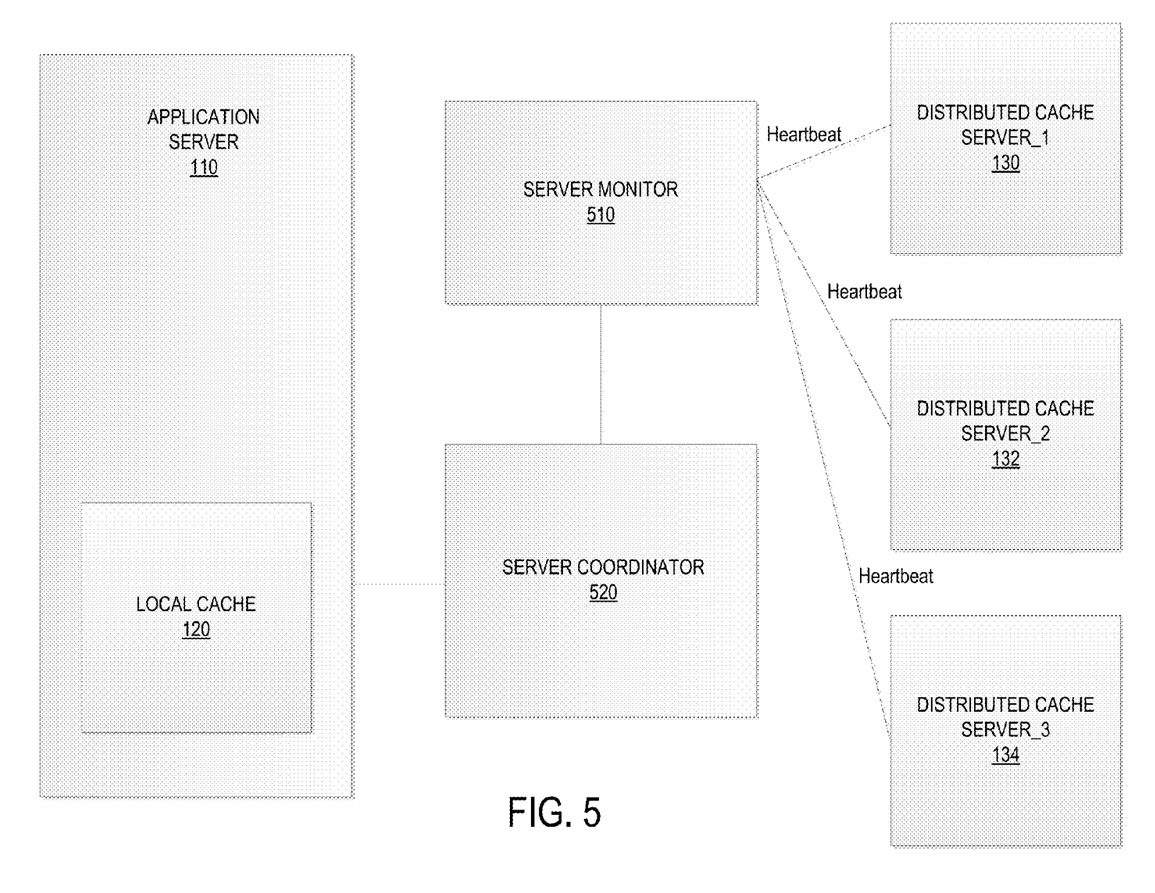
FIG. 5 depicts a block diagram of a network topology including a distributed cache system monitored by a server monitor according to one embodiment.

FIG. 5 presents a network topology comprising hardware and software components configured according to the embodiment of the present invention of FIG. 1, but with the addition of two new components. The network topology presented comprises client devices 102, 104, 106, and 108, connected to an application server 110. Application server 110 may have a local cache 120. It may also be connected to three cache servers 130, 132 and 134, which may be said to comprise a cache cluster. Each of these cache servers may comprises one or more servers.

The specific example of distributed cache system depicted in FIG. 1 will be referenced for purposes of explanation, but it will be understood that, in practice, a system implementing a intelligent distributed cache system of various embodiments may be performed in a system that does not have all of the features, or the same network context, as the distributed cache system depicted in FIG. 1.

It will be understood that the system represented in FIG. 5 may be used in conjunction with, or in the alternative to, the techniques and systems described in FIG. 1. That is, an application system may rely on one or the other, or both, of the systems for providing a safeguard against a breakdown at an individual cache depicted in FIGS. 1 and 5, to insure that a cache server which is unstable is not allowed to continue in operation.

As noted above, FIG. 5 also depicts two new network components not depicted in FIG. 1. The system depicted in FIG. 5 includes a server monitor 510 and a server coordinators. According to the embodiment depicted in FIG. 5, server monitor 510 is connected to each of cache servers 130, 132 and 134, that are part of a cache cluster. In some embodiments, server monitor 510 performs a function of monitoring the condition at those cache servers 130, 132 and 134.

In the particular embodiment depicted in FIG. 5, monitoring the health of the cache servers 130, 132 and 134 may involve periodically checking to see whether the state of a servers is still healthy by sending a heartbeat signal to cache servers 130, 132 and 134. If the servers respond with a responsive heartbeat signal, server monitor 510 may conclude that the cache servers are healthy.

When, however, cache monitor 510 does not receive responsive heartbeat signal from a given cache server of servers 130, 132 and 134 within an expected time frame, server monitor 510 may send a message to server coordinator 520 reporting the problem with the cache server in question.

In some embodiments, server coordinator 520 may be configured to, among other things, maintain information regarding the health of a group of cache servers. (It is noted that server coordinator 520 could in alternative embodiments also be responsible for keeping track of the health of additional servers, which are not cache servers.) Server coordinator 520 may perform the function of notifying a group of entities (e.g., the same group of cache servers whose health it is tracking) of problems being experienced at any of the group of cache servers, once server coordinator 520 receives a message indicating such difficulties from server monitor 510. The group of entities to whom notifications are sent when a cache server becomes unhealthy may, in some embodiments, have subscribed to the services of server coordinator 520. In the embodiment depicted in FIG. 5, application server 110 is among the group of entities which has subscribed to the services of server coordinator 520, for example.

That is, in the embodiment depicted in FIG. 5, when server coordinator 520 receives a message from server monitor 510 of a problem with one of cache servers 130, 132 and 134, it may notify all the entities which have subscribed to its service, including application server 110, of the problem, so that the subscribing entities may take appropriate actions. In the embodiment depicted in FIG. 5, once application server 110 receives the notification of the problem at the cache server in question, it may process this information at cache coordinator 140.

In other embodiments, the message reporting on the status of an unhealthy cache server may be sent directly from server monitor 510, to application server 110.

Once cache coordinator 140 receives a notification message alerting it to the condition of unhealthy cache server, according to one embodiment, cache coordinator 140 may remove the unhealthy cache server from the cache system for the time being.

According to alternative embodiments, cache coordinator 240 make assess the situation (perhaps by communicating with the cache server in question), and determine a responsive action. In one example, the responsive action may involve removing the cache server's IP address from a list of active cache servers on routing table 242. In this way it may be ensured that all cache requests are traversed only to healthy cache servers. Such revisions may enable cache requests to be redirected from the unhealthy cache server to healthy cache servers.

Further, in various embodiments, a mechanism may be provided for allowing the cache in question to return to active cache use once it has recovered. For example, next, a determination may be made regarding whether cache serve 232 has recovered. Such determination may be based, in some embodiments, on receiving a message from server coordinator 520 that the cache server has resume normal operations.

Once it is determined that the impaired cache server has recovered from the network or server problems, for example, that impaired its performance previously, the cache server may be allowed to resume normal operations; this may be referred to as recovery or restart process.

In some embodiments, resuming normal mode operations may be effectuated by cache coordinator 240 revising routing table 242, such that application server 210 resumes sending requests to the cache server again. In one embodiment, the process might reset everything, refreshing the system to start up again. As part of this process, new routing tables might be created, and the cache server may be added to the routing table 242 again.

Through use of the above mechanisms for responding to problems at a particular cache server, network traffic may be reduced, and application performance stabilized.

Additionally, as noted above, in various embodiments, techniques and mechanisms may be provided for differentiating between different types of cache objects, and intelligently assigning cache requests to cache servers of a distributed cache system based on cache object data types associated with the cache requests.

As noted above, a cache object data type may correspond to a variety of different characteristics. For example, in some embodiments, a data type may be determined by a company associated with the originating source of the data in question. In some embodiments, where data associated with a cache object originates from a company from whom a high volume of cache requests is expected, for example, all such cache requests may automatically be directed to remote cache servers of a distributed cache system in order to avoid overloading local caches in the system. In the alternative, in some embodiments, where data associated with a cache object originates from a company whose requests are to be given higher priority (for example, because of a particular quality of service arrangement), the cache object may be stored on a cache which provides faster access to data (e.g., a local cache).

In other embodiments, a data type may be determined based upon whether a cache object is a seldom changed and/or frequently used cache object. In some embodiments, where a cache object qualifies as a seldom changed and/or frequently used cache object, such cache object may be stored on a local cache in order to improve the speed with which data accesses of such cache object may be performed, as local caches typically provide faster access than remote caches.

In some embodiments, a data type may be determined based upon whether a cache object is associated with mission critical data. Cache objects associated with mission critical data may be stored in local caches in order to assure faster access to such data. In some embodiments, mission critical data may be identified by tags or other markers associated with the data.

Further, in some embodiments, mechanisms may be used for altering the caching strategy adopted for a data type over time based upon information gathered during a cache system's operations concerning the number of cache objects of different types generated by user requests to an application system, for example, and/or the frequency of user requests to access cache objects of different types in a cache system over time, for example.

Figure 6:
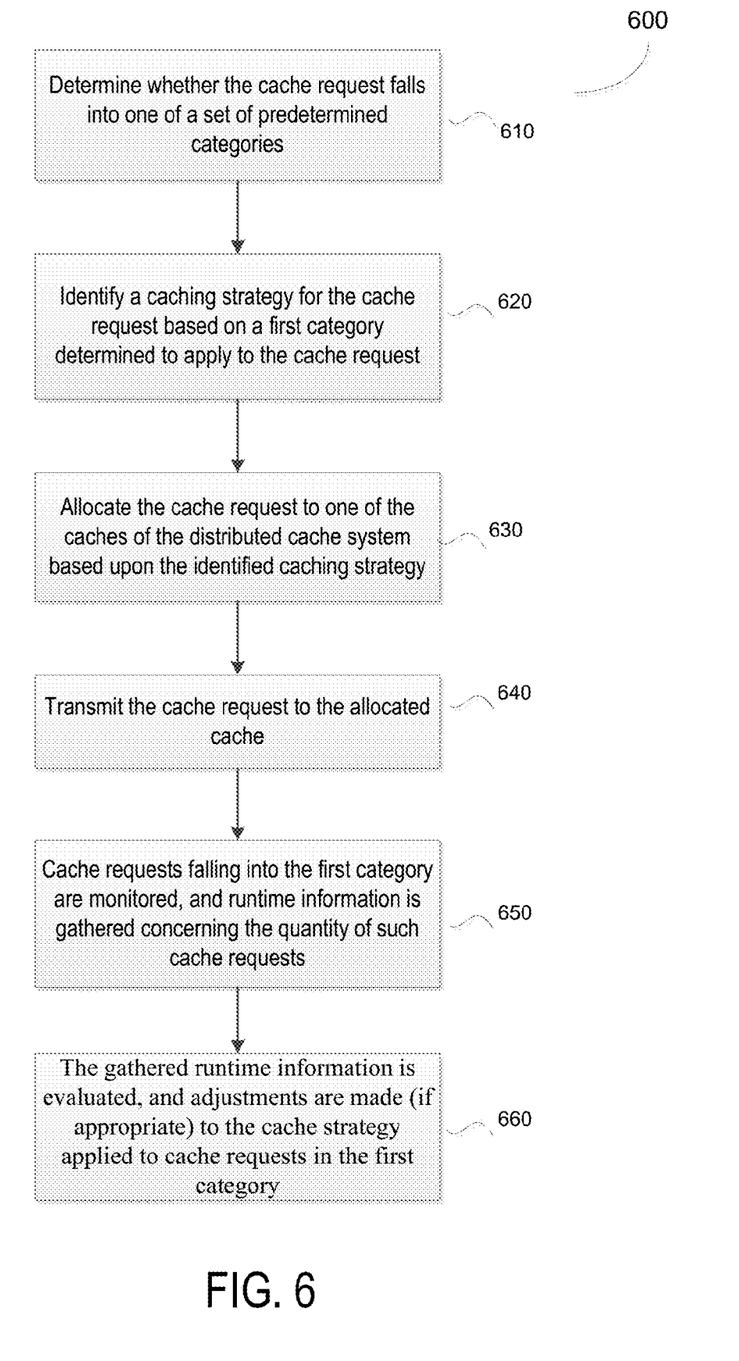
FIG. 6 depicts a flow for intelligently assigning a cache request to a cache server in a distributed cache system based on a cache object data type associated with the cache request, according to one embodiment.

FIG. 6 depicts a flow for intelligently assigning a cache request to a cache server in a distributed cache system based on a cache object data type associated with the cache request, according to one embodiment.

As depicted in FIG. 6, at 610, a cache request is evaluated, and it is determined whether the cache request falls into any one of a set of predetermined categories. Such categories may include: cache requests associated with data originating from a particular company (e.g., a company instance); cache requests which concern data that is seldom changed; cache requests concerning data that is frequently accessed; cache objects associated with particular functional groups (e.g., all cache objects associated with performance review features of the application system) or cache requests associated with data that is crucial to an enterprise, for example. Such flexibility allows a caching system to choose the right strategy for a cache object based on a type of behavior or a specific profile of a cache object. Fields may be added to cache keys associated with the cache objects to identify the particular defining characteristic of the cache object At 620, a caching strategy for the cache request is determined based on a first category determined to apply to the cache request. For example, cache objects associated with data that is crucial to an enterprise may be only be stored on a local cache located on the application server, that is, the cache objects are stored in local memory. By contrast, data that is infrequently accessed may be converted into cache objects to be stored on a remote cache cluster or centralized cache.

At 630, the cache request is allocated to one of the caches of a distributed cache system based upon a determined caching strategy. And, at 640, the cache request is transmitted to the allocated cache.

At 650, cache requests falling into the first category are monitored, and runtime information is gathered concerning the quantity of such cache requests. Other information such as the frequency with which cache objects associated with the first category are accessed; and/or the frequency with which such cache objects are modified may also be monitored.

At 660, the gathered runtime information is evaluated, and adjustments are made (if appropriate) to the cache strategy applied to cache requests in the first category. In some embodiments, allocations of different cache object data types to different cache servers may be adjusted based upon an analysis of such runtime information.

Further, in some embodiments, such changes to caching strategy may be performed dynamically "on the fly". That is, as information is gathered during a cache system's runtime operations, the results of such monitoring may be analyzed, and adjustments to caching strategy may be made, while the distributed cache system is operating.

The ability to change the caching strategy applied to a cache object according to the cache object's data type—for example, a company from whom the data originates, or the nature of the data associated with the cache object—provides the opportunity to improve the performance of a distributed cache system. Intelligently allocating cache objects to different caches based on characteristics of the cache objects allows for productive usage of each cache type.

Figure 7:
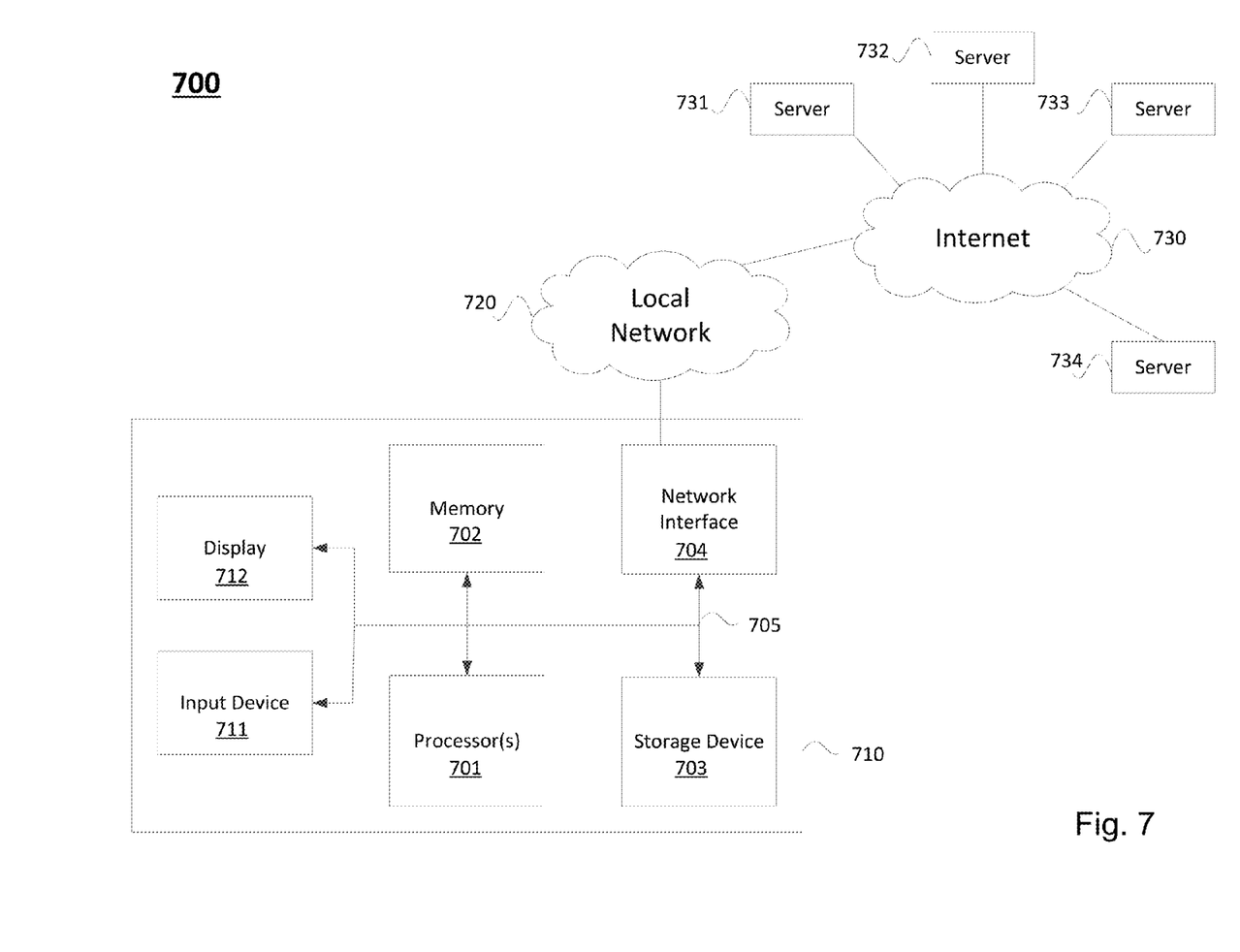
FIG. 7 depicts hardware of a special purpose computing machine configured to perform a process according to various embodiments of the present invention.

FIG. 7 illustrates hardware of a special purpose computing machine configured with a process according to the above disclosure. The following hardware description is merely one example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. One or more processor (s) 701 may take various forms including microcontrollers and microprocessors such as programmable devices (e.g., CPLDs and FPGAs) and unprogrammable devices such as gate array ASICs or general purpose microprocessors. Computer system 710 also includes a memory 702 coupled to bus 705 for storing information and instructions to be executed by processor 701, including information and instructions for performing some of the techniques described above, for example. This memory may also be used for storing programs executed by processor 701. Memory 702 may comprise a single or multiple storage components or devices. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device and memory may both include any suitable non-transitory computer-readable media such as those described herein. Memory 702 and storage device 703 may comprise a single or multiple memory or storage components or devices, respectively.

Computer system 710 may be coupled via bus 705 to an output device 712 for providing information to a computer user. Output device 612 may take the form of a display or speakers, for example. An input device 711 such as a keyboard, touchscreen, mouse, and/or microphone, may be coupled to bus 705 for communicating information and command selections from the user to processor 701. The combination of these components allows the user to communicate with the system. In some systems, bus 705 may represent multiple specialized buses, for example.

Computer system 710 also includes a network interface 704 coupled with bus 705. Network interface 704 may provide two-way data communication between computer system 710 and a local network 720. The network interface 704 may be a wireless or wired connection, for example. Computer system 710 may send and receive information through the network interface 704 across a local area network, an Intranet, a cellular network, or the Internet, for example. One example implementation may include computing system 710 acting as a central cache server that implements a cache safe mode solution to address instability at any cache server of a distribute cache server system as described above. In the Internet example, computing system 710 may be accessed by the mobile devices through a wireless connection to the Internet, for example, and computing system 710 may access data and features on backend systems that may reside on multiple different hardware servers 731-735 across the network. Servers 731-735 and server applications may also reside in a cloud computing environment, for example. Various embodiments may be practiced in a wide variety of network environments including, for example, TCP/IP-based networks, telecommunications networks, cellular communications networks, wireless networks, etc., or combinations of different network types.

As noted above, the apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described herein. Examples of such computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM).

In addition, the computer program instructions with which various embodiments of this disclosure are implemented may be executed according to a variety of computing models including a client/server model, a peer-to-peer model, on a stand-alone computing device, or according to a distributed computing model in which various functions described herein may be performed at different locations.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed:

1. A method for intelligently allocating cache requests among caches in a distributed cache system, the method comprising:
   allocating, at a computing device, a cache request to a first cache of the distributed cache system based on a marker identifying a mission critical data type associated with a cache object associated with the cache request, wherein the mission critical data type is identified based upon information gathered by monitoring operations concerning a number of cache objects of different types generated by user requests, and wherein the first cache comprises a local cache;
   monitoring the caches in the distributed cache system;
   when a slowdown in service is detected at the first cache, switching the first cache to a safe cache mode of operation;
   periodically performing a test to determine whether the first cache has resumed normal operations;
   when the first cache has resumed normal operations, switching the first cache to a normal cache mode of operations.

2. The method of claim 1, further comprising:
   measuring a time period a cache takes to respond to each of a plurality of cache requests;
   for each of the cache requests, when the time period the cache takes to respond to the cache request exceeds a first time threshold, throwing a time out exception;
   counting a number of time out exceptions thrown with respect to the cache over a period of time;
   when the number of time out exceptions thrown with respect to the cache exceeds a predetermined number over a predetermined time frame, entering the cache into cache safe mode of operations;
   at predetermined time intervals, performing a test to determine whether cache requests to the cache are again being performed in a timely manner; and
   when a determination is made that requests to the cache are again being timely executed, reentering the cache into a normal mode of operations.

3. The method of claim 2, wherein performing a test to determine whether cache requests to the cache are again being performed in a timely manner comprises:
   allowing a first time period of a first predetermined length to pass;
   sending a predetermined number of test cache requests to the cache server;
   allowing a second time period of a second predetermined length to pass;
   after the second time period has passed, determining whether any time out exceptions were thrown in connection with any of the test cache requests;
   upon determining after the second time period that one or more such time out exception were thrown, restarting the process of determining whether cache requests to the cache area being performed in a timely manner.

4. The method of claim 3, wherein performing a test to determine whether cache requests to the cache server are again being performed in a timely manner further comprises:
   when no time out exceptions were thrown in the second time period in connection with any of the test cache requests, reentering the cache into a normal mode of operations.

5. The method of claim 1, further comprising:
   monitoring the health of a cache server of a plurality of cache servers by periodically sending a heartbeat signal to the cache server;
   measuring a time period between a time that the heartbeat signal was sent, and a time a response to the heartbeat signal was received; and
   when the cache server does not provide a responsive signal within a predetermined heartbeat time frame, removing the cache server from operating in the distributed cache system in response.

6. The method of claim 5, further comprising:
   determining whether the cache server has recovered normal operations; and
   after determining that the cache server has recovered normal operations, allowing the cache server to operate in the cache system again.

7. The method of claim 1, wherein allocating a cache request to a first cache of the distributed cache system based on a data type associated with a cache object associated with the cache request, comprises:
   determining whether the cache request falls into one of a set of predetermined categories;
   identifying a caching strategy for the cache request based on a first category determined to apply to the cache request;
   allocating the cache request to one of the caches of the distributed cache system based upon the identified caching strategy; and
   transmitting the cache request to the allocated cache.

8. The method of claim 7, wherein when the cache request is associated with frequently accessed data, the cache request is transmitted to the local cache.

9. The method of claim 7, further comprising:
   gathering information at runtime concerning one or more of the following: a quantity of cache requests generated for each of the predetermined categories, a frequency with which cache objects associated with a first category are accessed, and a frequency with which cache objects associated with the first category are modified.

10. The method of claim 9, further comprising:
    analyzing the runtime information to determine whether improvements can be made to a caching strategy for the first category of cache requests;
    wherein making adjustments to the caching strategy comprises changing the allocation of the first category of cache requests from a first cache to a second cache.

11. A computer system for intelligently allocating cache requests among caches in a distributed cache system, comprising:
    one or more processors; and
    a non-transitory computer readable medium having stored thereon one or more programs, which when executed by the one or more processors, causes the one or more processor to singly or in combination:
    allocate a cache request to a first cache of the distributed cache system based on a marker identifying a mission critical data type associated with a cache object associated with the cache request, wherein the mission critical data type is identified based upon information gathered by monitoring operations concerning a number of cache objects of different types generated by user requests, and wherein the first cache comprises a local cache;
    monitor the caches in the distributed cache system;
    when a slowdown in service is detected at the first cache, switch the first cache to a safe cache mode of operation;

periodically perform a test to determine whether the first cache has resumed normal operations;

when the first cache has resumed normal operations, switch the first cache to a normal cache mode of operations.

12. The computer system of claim 11, wherein the one or more processors, singly or in combination, further:

measure a time period a cache takes to respond to each of a plurality of cache requests;

for each of the cache requests, when the time period the cache takes to respond to the cache request exceeds a first time threshold, throw a time out exception;

count a number of time out exceptions thrown with respect to the cache over a period of time;

when the number of time out exceptions thrown with respect to the cache exceeds a predetermined number over a predetermined time frame, enter the cache into cache safe mode of operations;

at predetermined time intervals, perform a test to determine whether cache requests to the cache are again being performed in a timely manner; and when a determination is made that requests to the cache are again being timely executed, reenter the cache into a normal mode of operations.

13. The computer system of claim 12, wherein performing a test to determine whether cache requests to the cache are again being performed in a timely manner comprises:

allowing a first time period of a first predetermined length to pass;

sending a predetermined number of test cache requests to the cache server;

allowing a second time period of a second predetermined length to pass;

after the second time period has passed, determining whether any time out exceptions were thrown in connection with any of the test cache requests;

upon determining after the second time period that one or more such time out exception were thrown, restarting the process of determining whether cache requests to the cache area being performed in a timely manner.

14. The computer system of claim 13, wherein performing a test to determine whether cache requests to the cache server are again being performed in a timely manner further comprises:

when no time out exceptions were thrown in the second time period in connection with any of the test cache requests, reentering the cache into a normal mode of operations.

15. The computer system of claim 11, wherein the one or more processors, singly or in combination, further:

monitor the health of a cache server of a plurality of cache servers by periodically sending a heartbeat signal to the cache server;

measure a time period between a time that the heartbeat signal was sent, and a time a response to the heartbeat signal was received;

when the cache server does not provide a responsive signal within a predetermined heartbeat time frame, remove the cache server from operating in the distributed cache system in response.

16. The computer system of claim 15, wherein the one or more processors, singly or in combination, further:

determine whether the cache server has recovered normal operations; and after determining that the cache server has recovered normal operations, allow the cache server to operate in the cache system again.

17. The computer system of claim 11, wherein allocating a cache request to a first cache of the distributed cache system based on a data type associated with a cache object associated with the cache request, comprises:

determining whether the cache request falls into one of a set of predetermined categories;

identifying a caching strategy for the cache request based on a first category determined to apply to the cache request;

allocating the cache request to one of the caches of the distributed cache system based upon the identified caching strategy; and transmitting the cache request to the allocated cache.

18. The computer system of claim 17, wherein the one or more processors, singly or in combination, further:

gather information at runtime concerning one or more of the following: a quantity of cache requests generated for each of the predetermined categories, a frequency with which cache objects associated with a first category are accessed, and a frequency with which cache objects associated with the first category are modified.

19. The method of claim 18, wherein the one or more processors, singly or in combination, further:

analyze the runtime information to determine whether improvements can be made to a caching strategy for the first category of cache requests;

wherein making adjustments to the caching strategy comprises changing the allocation of the first category of cache requests from a first cache to a second cache.

20. A non-transitory computer readable storage medium storing one or more programs, the one or more programs comprising instructions for:

allocating a cache request to a first cache of the distributed cache system based on a marker identifying a mission critical data type associated with a cache object associated with the cache request, wherein the mission critical data type is identified based upon information gathered by monitoring operations concerning a number of cache objects of different types generated by user requests, and wherein the first cache comprises a local cache;

monitoring the caches in the distributed cache system;

when a slowdown in service is detected at a first cache, switching the first cache to a safe cache mode of operation;

periodically performing a test to determine whether the first cache has resumed normal operations;

when the first cache has resumed normal operations, switching the first cache to a normal cache mode of operations.

* * * * *